(12) United States Patent
Dickman

(10) Patent No.: US 8,561,938 B2
(45) Date of Patent: Oct. 22, 2013

(54) DIRECTIONAL CONTROL FOR A HELICOPTER

(75) Inventor: Clifford C. Dickman, Montreal (CA)

(73) Assignee: Executive Access Inc., Montreal QC (CA)

( * ) Notice: Subject to any disclaimer, the term of this patent is extended or adjusted under 35 U.S.C. 154(b) by 213 days.

(21) Appl. No.: 13/149,333

(22) Filed: May 31, 2011

(65) Prior Publication Data

US 2012/0187237 A1   Jul. 26, 2012

Related U.S. Application Data

(60) Provisional application No. 61/349,953, filed on May 31, 2010.

(51) Int. Cl.
*B64C 27/82* (2006.01)

(52) U.S. Cl.
USPC ........................... 244/17.19; 244/17.13

(58) Field of Classification Search
USPC ........... 244/17.11, 17.13, 17.19, 17.23, 17.25
See application file for complete search history.

(56) References Cited

U.S. PATENT DOCUMENTS

| | | |
|---|---|---|
| 4,589,611 A | 5/1986 | Ramme et al. |
| 4,598,887 A | 7/1986 | Jordan |
| 4,660,785 A | 4/1987 | Munski |
| 5,131,603 A | 7/1992 | Meyers |
| 5,149,014 A | 9/1992 | Faller |
| 5,240,205 A | 8/1993 | Allongue |
| 5,301,900 A * | 4/1994 | Groen et al. ............... 244/17.25 |
| 5,934,873 A | 8/1999 | Greene |
| 6,007,298 A | 12/1999 | Karem |
| 6,021,976 A | 2/2000 | Exter |
| 6,416,015 B1 | 7/2002 | Carson |
| 6,435,453 B1 | 8/2002 | Carter, Jr. |
| 6,471,158 B1 | 10/2002 | Davis |
| 6,641,365 B2 | 11/2003 | Karem |
| 6,666,404 B1 | 12/2003 | Wingert et al. |
| 6,669,137 B1 | 12/2003 | Chen |
| 6,755,374 B1 | 6/2004 | Carson |
| 6,758,436 B2 | 7/2004 | Rehkemper et al. |
| 6,845,941 B2 | 1/2005 | Pica |
| 6,885,917 B2 | 4/2005 | Osder et al. |
| 6,892,988 B2 | 5/2005 | Hugues |
| 2004/0007644 A1 * | 1/2004 | Phelps et al. ............... 244/17.11 |
| 2010/0243792 A1 * | 9/2010 | Queiras et al. .................... 244/6 |

* cited by examiner

*Primary Examiner* — Timothy D Collins
*Assistant Examiner* — Jamie S Stehle
(74) *Attorney, Agent, or Firm* — Benoît & Côté Inc.

(57) ABSTRACT

The present document describes a yaw control system for a helicopter having a controllable aft rudder. The system comprises a fan for blowing low pressure air impinging upon the controllable aft rudder. During flight, the main rotor assembly drives the fan and the air flow impinging upon the controllable aft rudder creates a side force which enables yaw control.

19 Claims, 1 Drawing Sheet

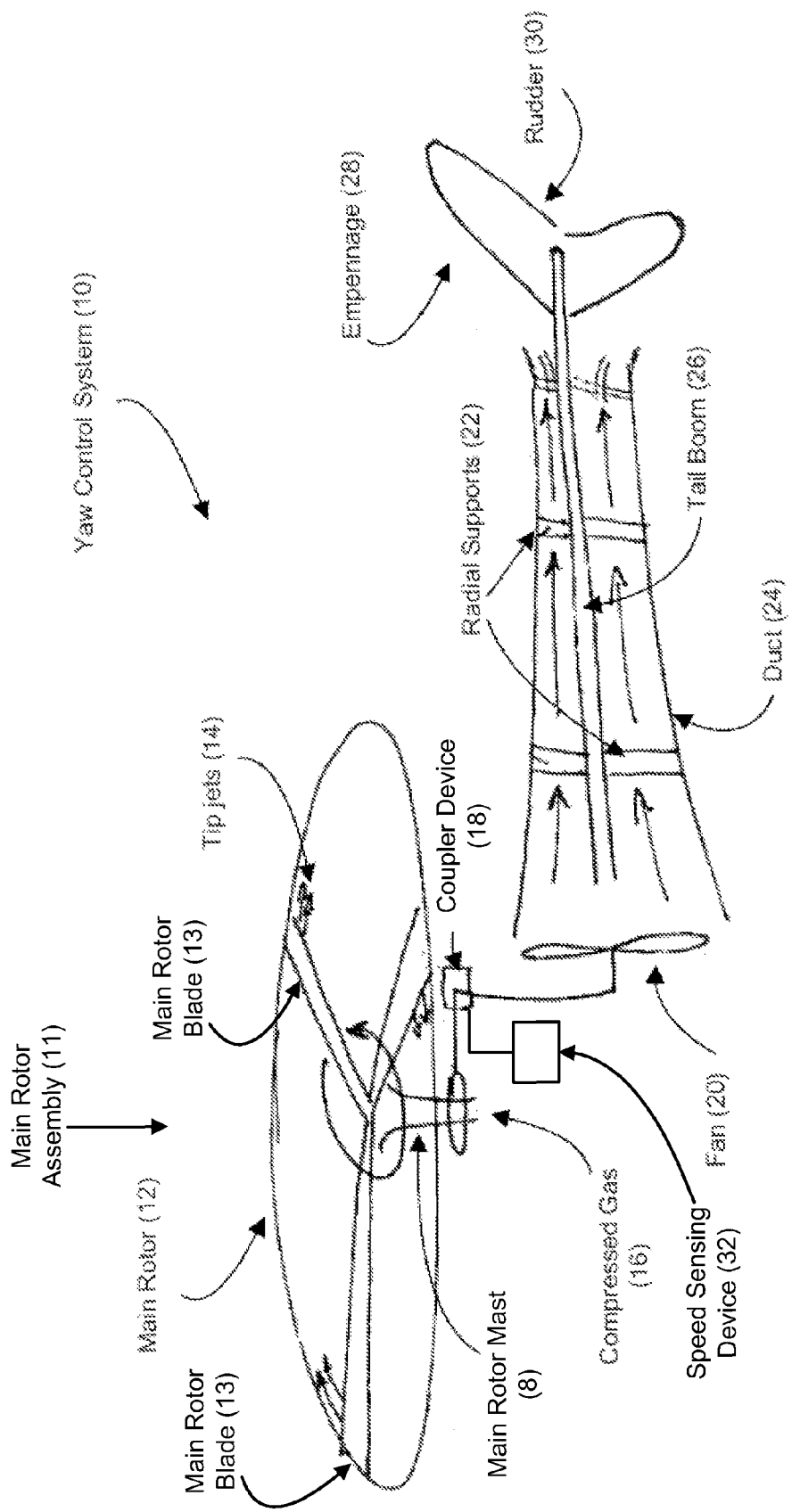

DIRECTIONAL CONTROL FOR A HELICOPTER

CROSS-REFERENCE TO RELATED APPLICATIONS

The present application claims priority from U.S. provisional application 61/349,953 filed May 31, 2010 and entitled "DIRECTIONAL CONTROL FOR A HELICOPTER", the content of which is incorporated herein by reference.

TECHNICAL FIELD

This description relates to the field of airborne vehicles. More particularly, this disclosure relates to rotary wing vehicles such as helicopters that need to maintain directional (i.e., yaw) control.

BACKGROUND

Conventional helicopter designs have been dominated by those which connect the engine to a single main rotor assembly by a transmission. The transmission permits the engine(s) (whether piston or gas turbine) to run at its optimal speed while reducing the rotational speed of the rotor to ensure optimal performance of the main rotor.

The twisting of the shaft that drives the main rotor creates an equal and opposite reaction that twists the fuselage or body of the helicopter in the opposite direction thereby requiring the use of a tail rotor, fenestron or system utilizing the Coanda effect in order to maintain directional stability.

In the case of a tail rotor and a fenestron, when the pilot pushes on one of the rudder pedals, the blade angle of the tail rotor changes producing more or less thrust and induces aircraft yaw. In the case of a system utilizing the Coanda effect, a rudder pedal input also changes the pitch of the internal fan blades increasing or decreasing the air flow through the duct which is then ejected through slots on the side of the tail boom inducing yaw.

In helicopters that do not require a tail rotor, other solutions for maintaining directional control must be devised.

SUMMARY

According to an embodiment, there is provided a yaw control system for a helicopter having a controllable aft rudder and a main rotor assembly. The yaw control system comprises: a low pressure fan for producing a low pressure air flow impinging upon the controllable aft rudder, the low pressure fan being mechanically connected to the main rotor assembly wherein during flight, the main rotor assembly drives the low pressure fan and the low pressure air flow impinging upon the controllable aft rudder creates a side force which enables yaw control.

According to an embodiment, the yaw control system further comprises a coupling device between the main rotor assembly and the low pressure fan for providing the mechanical connection therebetween.

According to an embodiment, the coupling device comprises a clutch for selectively mechanically disconnecting the low pressure fan from the main rotor assembly.

According to an embodiment, the yaw control system further comprises a speed sensing device for detecting a forward speed of the helicopter, the speed sensing device sending a control signal to the clutch to control selectively the disconnecting of the low pressure fan from the main rotor assembly.

According to an embodiment, the main rotor assembly comprises a main rotor mast and where the coupling device provides the mechanical connection is between the main rotor mast and the low pressure fan.

According to an embodiment, the coupling device comprises one of a transmission and a belt drive.

According to an embodiment, the yaw control system further comprises a duct for directing the air from the low pressure fan to the controllable aft rudder.

According to an embodiment, the duct is located substantially between the low pressure fan and the controllable aft rudder.

According to an embodiment, there is provided a helicopter which comprises: a main rotor assembly; a controllable aft rudder; a yaw control system comprising a low pressure fan for producing a low pressure air flow impinging upon the controllable aft rudder, the low pressure fan being mechanically connected to the main rotor assembly; wherein during flight, the main rotor assembly drives the low pressure fan and the low pressure air flow impinging upon the controllable aft rudder creates a side force which enables yaw control.

According to an embodiment, the main rotor assembly comprises a main rotor mast and where the coupling device provides the mechanical connection is between the main rotor mast and the low pressure fan.

According to an embodiment, the main rotor mast comprises a hollow portion for feeding air to the air passage of the main rotor blades.

According to an embodiment, the main rotor assembly comprises main rotor blades each of which comprises an air passage and tip jets, upon exiting the tip jets, air drives the main rotor assembly.

According to an embodiment, the helicopter further comprises a duct for directing the air from the low pressure fan to the controllable aft rudder.

According to an embodiment, there is provided a yaw control system for a helicopter having an aft rudder and a main rotor assembly. The yaw control system comprises: a fan for producing an air flow impinging upon the aft rudder, the fan being mechanically connected to the main rotor assembly; wherein during flight, the main rotor assembly drives the fan and the air flow impinging upon the aft rudder creates a side force which enables yaw control.

According to an embodiment, the aft rudder forms part of the yaw control system and comprises a controllable aft rudder.

According to an embodiment, the fan comprises a low pressure fan for producing a low pressure air flow impinging upon the aft rudder.

According to an embodiment, there is provided a yaw control system for a helicopter having a controllable aft rudder. The system comprises a fan for blowing low pressure air impinging upon the controllable aft rudder. The main rotor drives the fan and the air flow impinging upon the controllable aft rudder creates a side force which enables yaw control.

According to an embodiment, the yaw control system further comprises a coupling device between the main rotor and the fan.

BRIEF DESCRIPTION OF THE DRAWINGS

Further features and advantages of the present disclosure will become apparent from the following detailed description, taken in combination with the appended drawings, in which:

FIG. 1 is a schematic diagram illustrating a yaw control system according to an embodiment.

DETAILED DESCRIPTION

The types of helicopters to which this disclosure applies include but are not limited to helicopters using counter-rotating sets of rotors either in the same plane of rotation or offset and equally balanced about a vertical line and helicopters utilizing tip jets to push the blades around the hub.

This disclosure applies equally to tip-jet helicopters that burn fuel in jets at the rotor blade tips (hot cycle), tip-jets driven by compressed gas produced either by an aircraft gas turbine that mixes gas from a dedicated compressor or fan which is then mixed with the exhaust gas from the engine (warm cycle) and compressed gas produced by a dedicated compressor or fan only (cold cycle).

Referring now to FIG. 1, a schematic diagram illustrates a partial view of a helicopter in which a directional control system 10 (aka a yaw control system) according to an embodiment is shown.

The yaw control system 10 is for a helicopter (not shown) that has a controllable rudder 30 and a main rotor assembly 11. The main rotor assembly comprises a main rotor 12 and a main rotor mast 8.

The yaw control system 10 comprises a fan 20 for blowing low pressure air impinging upon the controllable rudder 30. During flight, the main rotor 12 drives the fan 20 and the air flow impinging upon the controllable rudder 30 creates a side force (left or right) which enables yaw control of the helicopter.

According to an embodiment, the yaw control system 10 further comprises a coupling device 18 between the main rotor 12 and the fan 20. An example of a coupling device is a transmission or a belt drive (not shown).

According to an embodiment, the yaw control system 10 therefore provides yaw control for a tip-jet driven helicopter or other helicopters that do not produce torque on the fuselage under all conditions of flight including loss of power from the engine(s).

According to FIG. 1, compressed gas 16 is produced by the aircraft engine(s) (not shown). The compressed gas 16 travels in a hollow portion inside the main rotor mast 8 and is transferred to an air passage (not shown) within each main rotor blade 13 of the main rotor 12. The compressed gas exits each blade at tip jets 14 and thereby drives the main rotor 12 of the main rotor assembly 11.

As stated earlier, the main rotor assembly 11 also drives the fan 20 via a small transmission or belt drive 20. The fan 20 produces low pressure air flow that impinges upon the controllable rudder 30 to create a side force on the empennage 28. At high speed the flow of air over the rudder produced by the forward motion of the helicopter further increases the effectiveness of the controllable rudder 30. The side force is either left or right in accordance with the pilot's rudder pedal position. The yaw control system 10 is hence capable of producing yaw in hover and at speed and consequently at all points within the flight envelope, including autorotation.

In the embodiments described herein the yaw control system 10 therefore is not powered directly by the engine(s) of a helicopter. The fuselage (main body of the helicopter) does not require an anti-torque device such as a tail-rotor. The yaw control system 10 is different from existing prior art systems that use a battery-powered fan or a fan powered from the aircraft's electrical system since these prior systems are more prone to risk than the presently described system in the event of an electrical system failure.

According to an embodiment, the low pressure air flow travels within a duct 24 that is supported in a radial direction by struts (supports) 22 connected to the tail boom 26 itself. The radial supports 22 are aerodynamically shaped to straighten the air flow produced by the fan 20 in addition to providing structural support to the duct 24 so as to maximize the efficiency of the yaw control system 10 while minimizing turbulence in the duct 24. The radial supports 22 at the exit of the duct 24 are designed to distribute the air over and across the empennage 28.

According to an embodiment, the controllable rudder 30, whether hinged or all moving, is connected to the tail boom 26 and is controlled by inputs to the rudder pedals at the pilot's feet (not shown).

According to an embodiment, the fan 20 has a low pressure ratio and tip speed so as to minimize the amount of energy consumed while providing sufficient air flow to provide a required rate of yaw in hover for required cross-wind flight conditions.

In operation, in hover, there is sufficient air flow produced by the fan to produce the required side force on the helicopter tail to satisfy cross-wind requirements. At higher speeds, even though the fan 20 continues to provide air flow over the controllable rudder 30 surface, the forward speed of the helicopter enhances the air flow over the controllable rudder 30 surface.

According to an embodiment, the coupling device further comprises clutch (not shown). At higher speeds, the fan 20 may be selectively disconnected mechanically from the main rotor assembly 11 (under control of the clutch) to conserve energy and reduce mission fuel burn and reconnected during lower speeds and hover.

According to an embodiment, the yaw control system further comprises a speed sensing device 32 for detecting the forward speed of the helicopter. The speed sensing device 32 is for sending a control signal to the clutch to control selectively the disconnecting of the fan 20 from the main rotor assembly 11.

Previous designs for directional control of helicopters that do not produce torque on the body or fuselage have used the engine exhaust to blow air over a moveable rudder. While this method achieves the required directional control in powered flight, in the event of engine failure (particularly for a single engine helicopter), there will be an inherent loss of directional control particularly in hover.

Significantly, in this disclosure, in the event of engine failure, because the fan 20 is coupled to the main rotor assembly 11, then as long as the main rotor 12 is turning, including during autorotation, there will always be directional control within the flight envelope which would not otherwise be the case.

While preferred embodiments have been described above and illustrated in the accompanying drawings, it will be evident to those skilled in the art that modifications may be made therein without departing from the essence of this disclosure. Such modifications are considered as possible variants comprised in the scope of the disclosure.

The invention claimed is:

1. A yaw control system for a helicopter having a controllable aft rudder, an engine and a main rotor assembly, the yaw control system comprising:
 a low pressure fan for producing a low pressure air flow impinging upon the controllable aft rudder, the low pressure fan being mechanically connected to the main rotor assembly;
 wherein during flight, the main rotor assembly drives the low pressure fan without a direct load path from the engine to the low pressure fan and the low pressure air flow impinging upon the controllable aft rudder creates a side force which enables yaw control.

2. The yaw control system of claim 1, further comprising a coupling device between the main rotor assembly and the low pressure fan for providing the mechanical connection therebetween.

3. The yaw control system of claim 2, wherein the coupling device comprises a clutch for selectively mechanically disconnecting the low pressure fan from the main rotor assembly.

4. The yaw control system of claim 3, further comprising a speed sensing device for detecting a forward speed of the helicopter, the speed sensing device sending a control signal to the clutch to control selectively the disconnecting of the low pressure fan from the main rotor assembly.

5. The yaw control system of claim 2, wherein the main rotor assembly comprises a main rotor mast and where the coupling device provides the mechanical connection is between the main rotor mast and the low pressure fan.

6. The yaw control system of claim 5, wherein the coupling device comprises a clutch for selectively mechanically disconnecting the low pressure fan from the main rotor assembly.

7. The yaw control system of claim 2, wherein the coupling device comprises one of a transmission and a belt drive.

8. The yaw control system of claim 1, further comprising a duct for directing the air from the low pressure fan to the controllable aft rudder.

9. The yaw control system of claim 8, wherein the duct is located substantially between the low pressure fan and the controllable aft rudder.

10. A helicopter comprising:
a main rotor assembly;
an engine;
a controllable aft rudder;
a yaw control system comprising a low pressure fan for producing a low pressure air flow impinging upon the controllable aft rudder, the low pressure fan being mechanically connected to the main rotor assembly;
wherein during flight, the main rotor assembly drives the low pressure fan without a direct load path from the engine to the low pressure fan and the low pressure air flow impinging upon the controllable aft rudder creates a side force which enables yaw control.

11. The yaw control system of claim 10, further comprising a coupling device between the main rotor assembly and the low pressure fan for providing the mechanical connection therebetween.

12. The yaw control system of claim 11, wherein the main rotor assembly comprises a main rotor mast and where the coupling device provides the mechanical connection is between the main rotor mast and the low pressure fan.

13. The helicopter of claim 12, wherein the main rotor assembly comprises main rotor blades each of which comprises an air passage and tip jets, upon exiting the tip jets, air drives the main rotor assembly.

14. The helicopter of claim 13, wherein the main rotor mast comprises a hollow portion for feeding air to the air passage of the main rotor blades.

15. The helicopter of claim 10, further comprising a duct for directing the air from the low pressure fan to the controllable aft rudder.

16. The helicopter of claim 15, wherein the duct is located substantially between the low pressure fan and the aft rudder.

17. A yaw control system for a helicopter having an aft rudder, an engine and a main rotor assembly, the yaw control system comprising:
a fan for producing an air flow impinging upon the aft rudder, the fan being mechanically connected to the main rotor assembly;
wherein during flight, the main rotor assembly drives the fan without a direct load path from the engine to the low pressure fan and the air flow impinging upon the aft rudder creates a side force which enables yaw control.

18. The yaw control system of claim 17, wherein the aft rudder forms part of the yaw control system and comprises a controllable aft rudder.

19. The yaw control system of claim 17, wherein the fan comprises a low pressure fan for producing a low pressure air flow impinging upon the aft rudder.

* * * * *